(No Model.) 5 Sheets—Sheet 1.
P. L. SIMPSON.
BRICK MACHINE.
No. 384,872. Patented June 19, 1888.
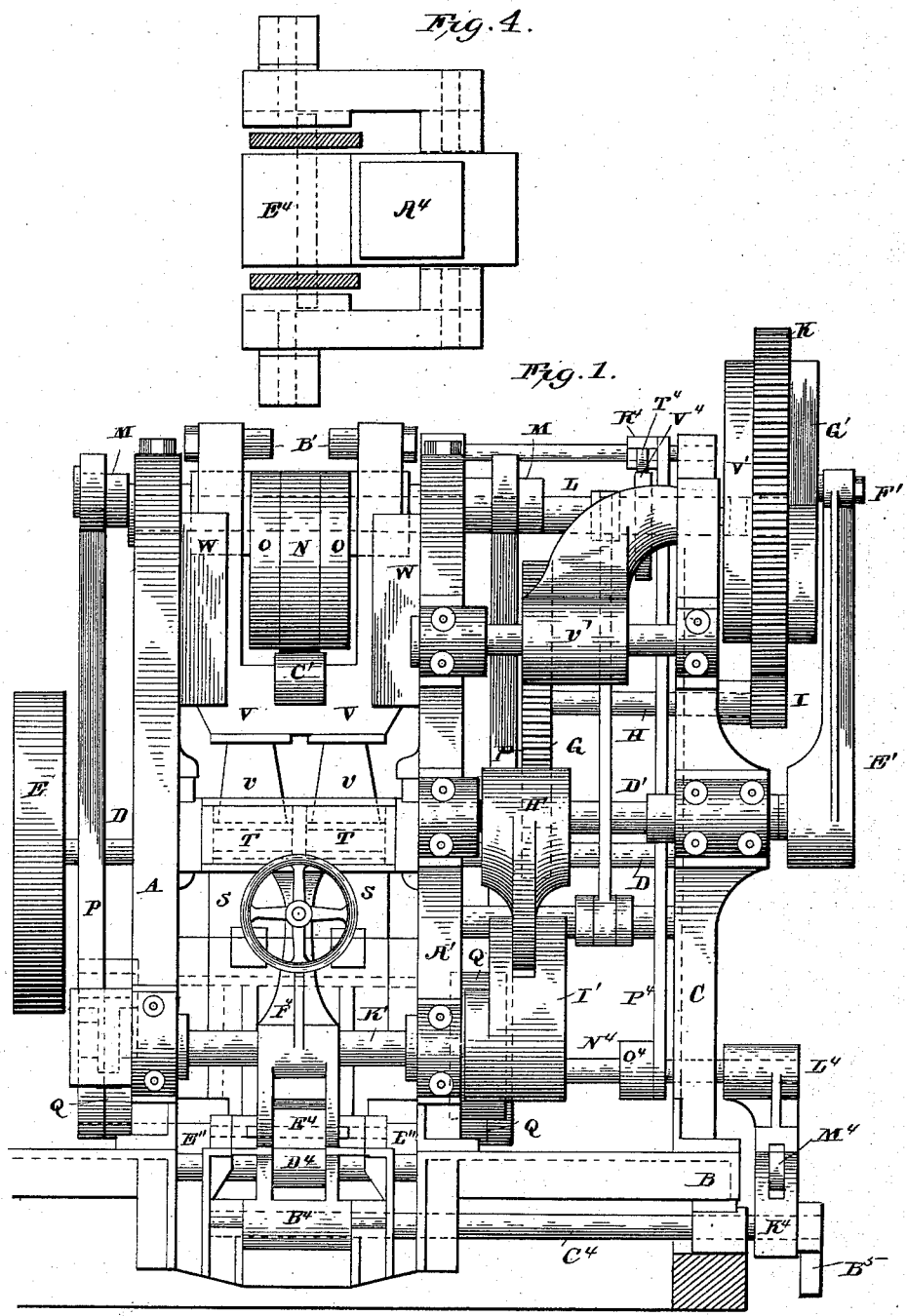
WITNESSES.
Edwin L. Yewell.
John Enders Jr.
INVENTOR.
Peter L. Simpson,
By
L. W. Ensabaugh,
Attorney.

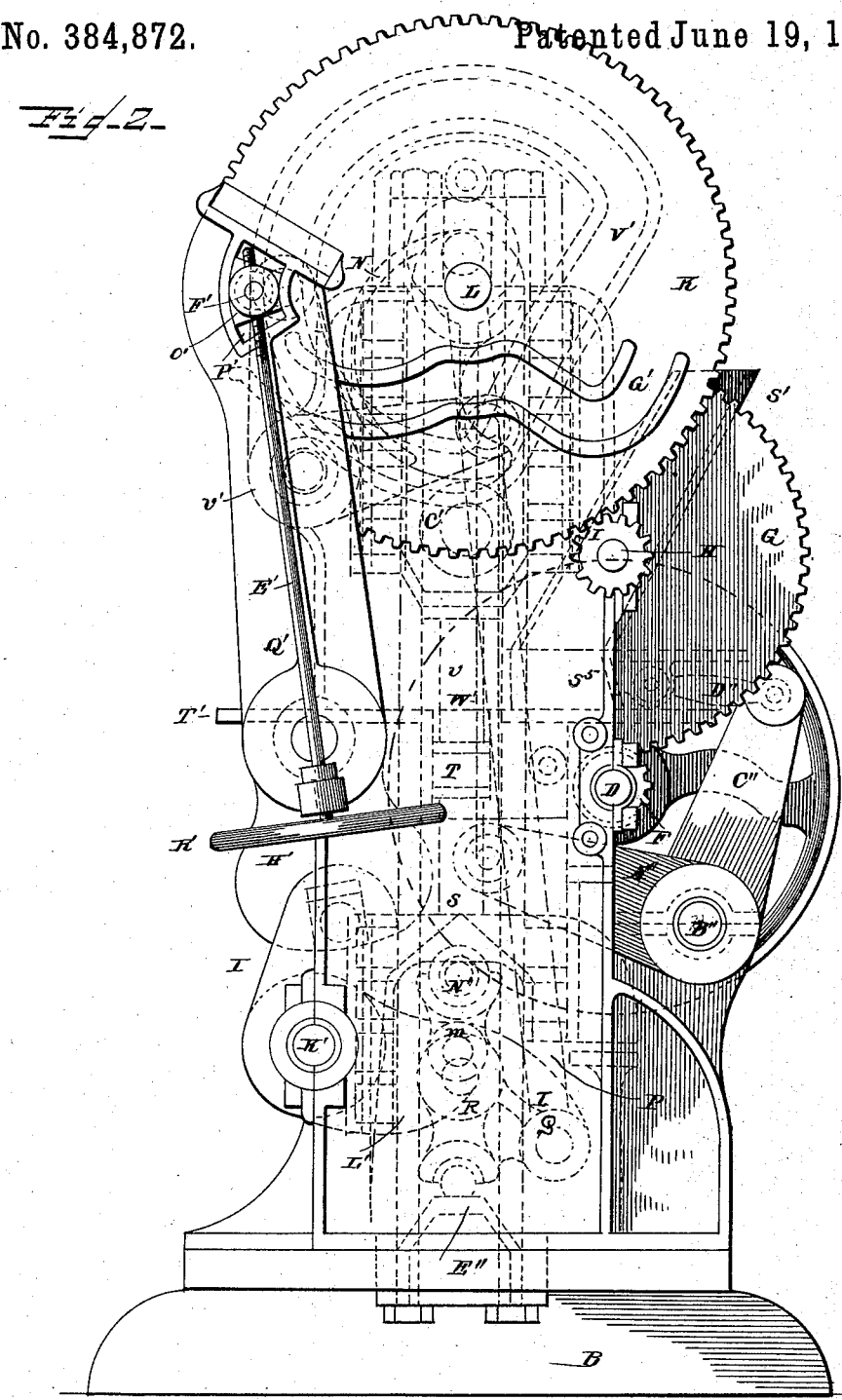

(No Model.) 5 Sheets—Sheet 3.
P. L. SIMPSON.
BRICK MACHINE.
No. 384,872. Patented June 19, 1888.
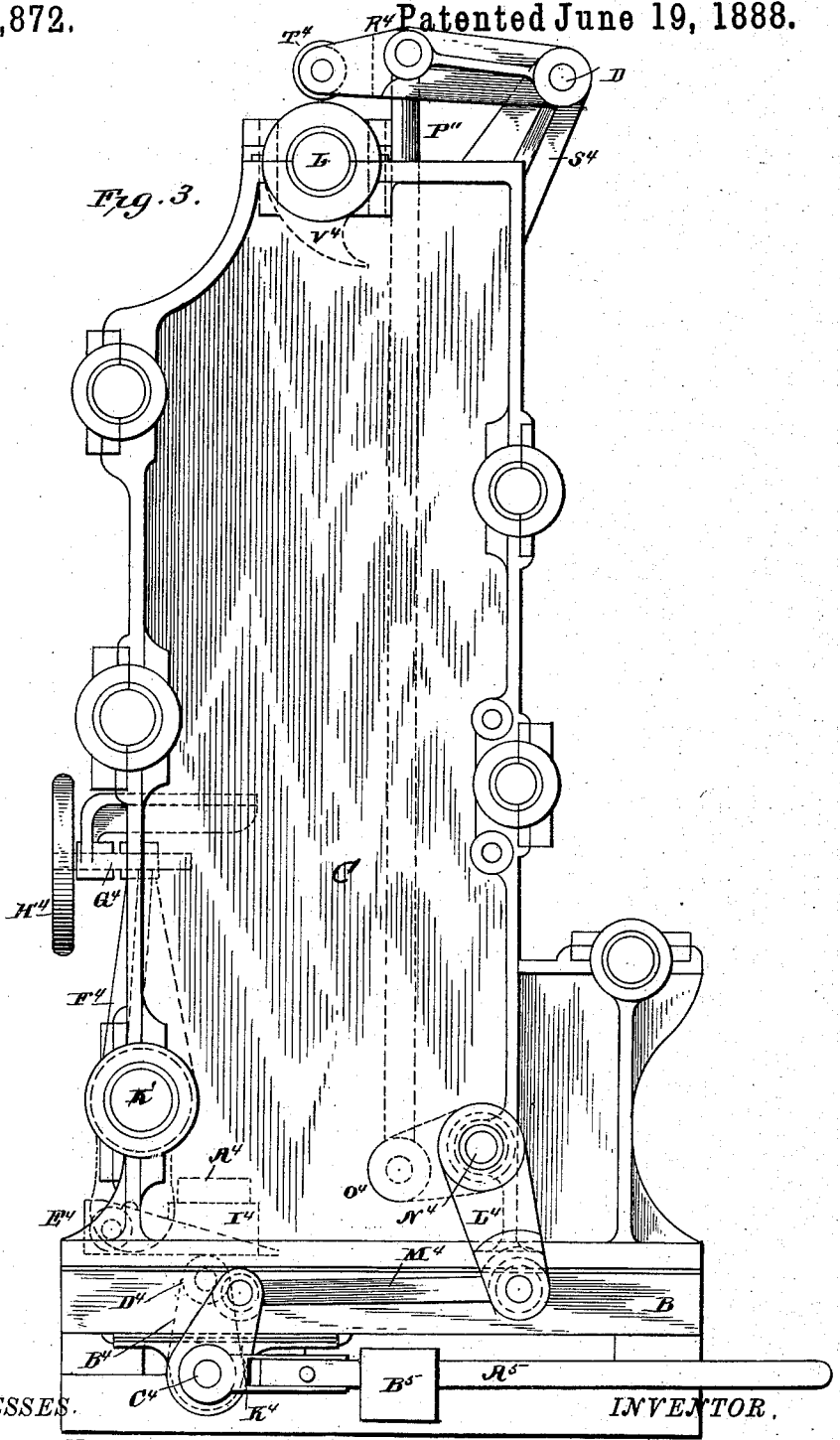
WITNESSES
Edwin L. Yewell.
John Enders Jr.
INVENTOR
Peter L. Simpson.
By
E. W. Ansabaugh,
Attorney.

(No Model.) 5 Sheets—Sheet 4.
P. L. SIMPSON.
BRICK MACHINE.

No. 384,872. Patented June 19, 1888.

WITNESSES.
Edwin I. Yewell
A. Jenkins.

INVENTOR.
Peter L. Simpson.
By L. M. Ginsabaugh
Attorney.

(No Model.)  5 Sheets—Sheet 5.

P. L. SIMPSON.
BRICK MACHINE.

No. 384,872.  Patented June 19, 1888.

WITNESSES.
Edwin L. Yewell
A. Jenkins.

INVENTOR.
Peter L. Simpson.
By
L. W. Finsabaugh.
Attorney.

UNITED STATES PATENT OFFICE.

PETER L. SIMPSON, OF MINNEAPOLIS, MINNESOTA.

BRICK-MACHINE.

SPECIFICATION forming part of Letters Patent No. 384,872, dated June 19, 1888.

Application filed November 28, 1887. Serial No. 256,345. (No model.)

*To all whom it may concern:*

Be it known that I, PETER L. SIMPSON, a citizen of the United States of America, residing at Minneapolis, in the county of Hennepin and State of Minnesota, have invented certain new and useful Improvements in Brick-Machines, of which the following is a specification, reference being had therein to the accompanying drawings.

My invention relates to improvements in brick-making machines, and more particularly to that class of machines known as "dry" or "semi-dry" clay machines.

The object of my invention is to provide a machine which will press the clay into perfect and solid bricks and eject them from the mold without cracking or injuring the same by the force of suction.

A further object of my invention is to regulate or adjust the travel or throw of the lower plunger, in order to increase or diminish the holding capacity of the molds and in this way regulate the density of the brick.

A further object of my invention is to remove the gear-wheels and the parts which come into frictional contact away from underneath the molds and clay-hopper, in order that the sand and grit may not injure or wear them away too rapidly.

Another object of my invention is to have the molded brick made as far down in the mold as possible, thereby producing a glossy surface on the sides and ends of the brick.

A further object of my invention is to operate the pressing mechanism so that the clay in the molds is moving vertically either upward or downward while the pressing is taking place, so as to obviate the formation of a soft central seam around the middle or face of the brick.

Another object of my invention is to provide a safe and reliable means for oiling the molds of the machine while the brick is being ejected therefrom.

Other novel features will be fully described hereinafter, and pointed out in the claims.

Figure 5:
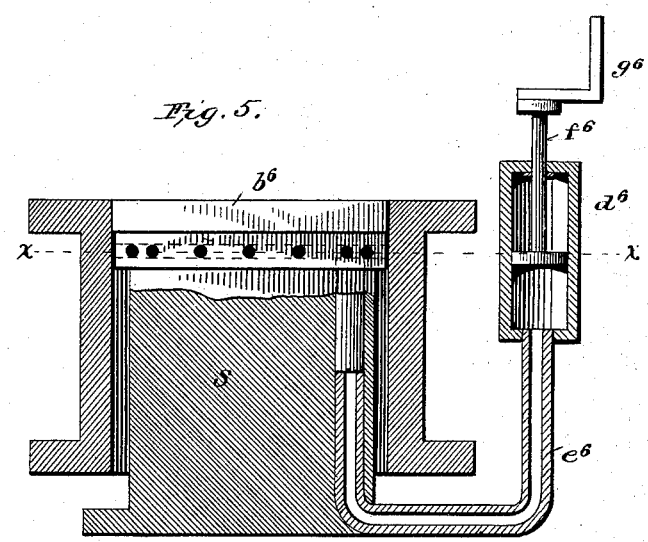
Figure 6:
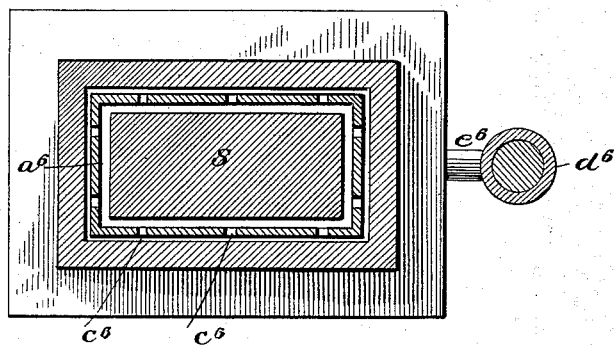
Figure 7:
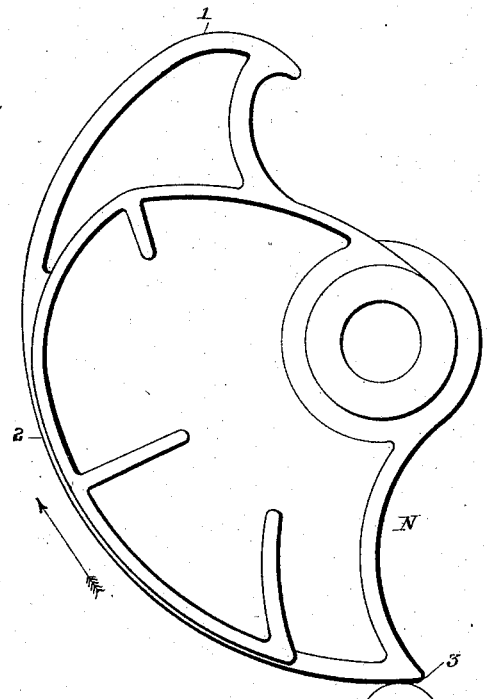
Figure 8:
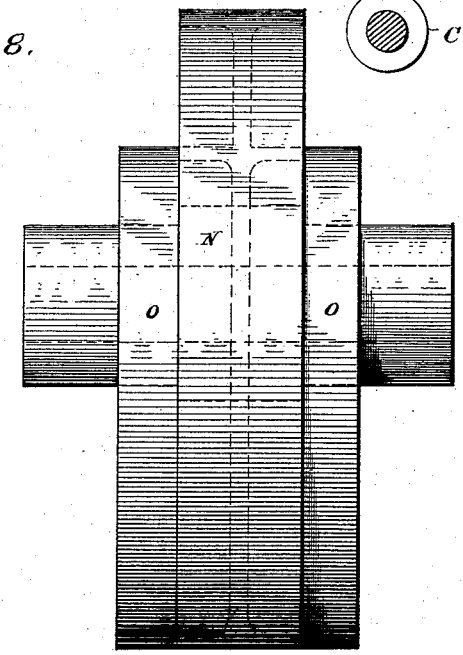

Referring to the drawings, Figure 1 is a front view of my improved machine. Fig. 2 is a side view of the same. Fig. 3 is also a side view of the frame of the machine with all the operating parts removed, except those for adjusting the fall of the lower plungers. Fig. 4 is a top view of the wedge for raising and lowering the rubber cushion. Fig. 5 is a vertical sectional view of the oiling devices, and Fig. 6 is a horizontal sectional view of the same. Fig. 7 is a side view of the cams for operating the upper plungers. Fig. 8 is an end view of the same.

A and A' indicate the sides of the machine, which are made of cast-iron or other suitable material, mounted on a suitable base, B, in a firm and substantial manner, the sides of the machine being connected by suitable cross-bars or bed-plate, so as to form a rigid structure for the operating parts of the machine, as will more fully appear.

C is a supplemental standard, secured at its lower end to the base B and to the frame A' of the machine, said standard C, together with the frame A', forming supports for the shafts, pinions, and levers which operate the clay-box and eject the bricks from the molds, and also the mechanism for allowing or forcing the partially-made brick down into the mold after the top plunger drops and before further pressure takes place.

D is a shaft mounted in suitable bearings in the sides of the machine, to the outer end of which is secured the band-pulley E. The shaft D is provided with a pinion-wheel, F, which meshes with and imparts motion to the spur-wheel G, mounted on one end of the shaft H, the other end of the shaft H being provided with a spur-gear, I, which meshes with and imparts motion to the gear-wheel K, secured to the outer end of the shaft L. The shaft L is mounted in suitable bearings in the upper ends of the frames A A' and standard C, and is provided with crank-arms M M and cams N and O, for a purpose which will be described hereinafter.

P are bars, the upper ends of which are secured to the crank-arms M of the shaft L, while the lower ends are secured to bell-crank levers Q, which are arranged to operate the toggles R and raise the lower plungers, S, to compress the clay within the molds T, said plungers S being arranged so as to have a further upward movement to eject the brick from the molds by means of certain devices which will be described hereinafter.

U are the upper plungers, secured to the yoke V, said yoke being arranged to work in guides W secured to the sides of the machine. The upper end of the yoke is slotted, so as to embrace the shaft L, and is provided with studs and friction-rollers B', the function and office of which will be described with relation to cams O.

As before indicated, N is a cam secured to the shaft L, which is adapted to impinge on the friction-roller C', mounted in the yoke V, and by means of which the upper plungers are forced down to compress the clay within the molds.

O O are cams cast with or otherwise secured to each side of the cam N, said cams O being so arranged and timed in their movement that after the cam N has exerted its pressure on the upper plungers these cams O will come in contact with the friction-rolls B' and raise the upper plungers, U, so as to allow the brick to be ejected from the mold and a fresh charge of clay be placed therein.

In order to eject the brick from the mold, I employ the following devices.

D' is a shaft mounted in suitable bearings in the frame A' and standard C, to the outer end of which is secured the rocking arm E', said arm being provided at its upper end with a pin, F', and friction-roller, which projects into the path of the cam-groove G', formed upon or secured to the side of the gear-wheel K.

H' is an arm secured to the shaft D', the lower end of which is secured to the upper arm of the lever I', which is secured to the shaft K', said shaft being provided with arms L', one at each side, which are in turn connected by links M to the shaft N', which extends across the machine below the lower plungers, and by which means the lower plungers are raised to eject the brick from the molds.

In order to resist the concussion of the fall of the upper plunger, I employ a vertically-movable rubber bumper or cushion, $A^4$, which is operated by the following devices, reference being now made to the devices shown in Fig. 3:

$B^4$ is an arm secured to the rock-shaft $C^4$, said arm being provided with a friction-wheel, $D^4$, which impinges against the under side of the inclined or wedge-shaped block $E^4$. The outer end of the wedge-shaped block $E^4$ is pivoted to the lower end of the lever $F^4$, said lever being pivoted to or fulcrumed to the shaft K'. The upper end of the lever $F^4$ is connected to a screw-shaft, $G^4$, on which is mounted the hand-wheel $H^4$, and by which means the wedge-shaped block $E^4$ is moved in or out. The inner end of the block $E^4$ slides under the casting $I^4$, on which the rubber bumper or cushion $A^4$ is mounted.

$K^4$ is an arm secured to the outer end of the shaft $C^4$, the upper end of which is secured to the lower end of the arm $L^4$ by means of the rod $M^4$, said arm $L^4$ being secured to the outer end of the shaft $N^4$.

$O^4$ is a lever-arm secured to the shaft $N^4$, inside of the frame C, to the outer end of which is secured the lower end of the rod $P^4$, the upper end of said rod being secured to the lever $R^4$. One end of the lever $R^4$ is pivoted to the bracket $S^4$, while the other end is provided with a friction-wheel, $T^4$, which projects over into the path of the cam $V^4$, mounted on the main driving-shaft L.

$A^5$ is a lever secured to the end of the shaft $C^4$, on which is placed a weight, $B^5$, the office of which is to keep the arm $D^4$ in a vertical line and the rubber cushion in an elevated position at all times, except when the same is being acted upon by the cam $V^4$ and the intermediate mechanism.

After the bricks have been ejected from the molds by the raising of the lower plungers, the weighted lever causes the arm $D^4$ to assume a vertical position, which impinges on the lower side of the wedge $E^4$, raises the rubber cushion to its highest position, and upon which the cross-head carrying the lower plungers rests during the time the molds are being filled. After the molds are filled and the filling devices removed from under the upper plunger, the upper plunger drops onto the clay within the mold, the force of the blow being resisted by the rubber cushion $A^4$. The cam $V^4$ on the main shaft L now operates on the lever $R^4$ and the intermediate mechanism to throw the arm $D^4$ forward and allow the back end of the wedge-shaped block $E^4$ and the rubber cushion $A^4$ to fall, so that the cross-head carrying the lower plungers will rest on the stops E'', and during this time the upper plungers, the lower plungers, and the partially-pressed brick moved downward in the mold, thus giving the air an opportunity to escape from the mold before the final pressure, and also to smooth the sides of the brick. After the lower cross-head has been seated on the stops E, the cam N exerts its pressure on the upper plunger to press the upper side of the brick, and this pressure takes place while the cam is impinging on the roller C', from the point 1 to the point 2. (Shown in Fig. 7.) The radius of the cam is diminished from the point 2 to the point 3, so as to allow the upper plunger to be carried up by the lower plunger and the clay within the mold when the toggles assume a vertical line to do the final pressing on the lower side of the brick. The contour of the cam from the point 2 to the point 3 does not permit the upper plunger to travel as fast as the lower plunger, so that while the partially or nearly formed brick is receiving the final pressure on the under side the brick has a movement in the molds during the pressure, which effectually prevents the seam or granular formation in the center of the brick, and this I consider an important feature of my invention. The cams O are so formed and timed with relation to the upper plungers that they do not impinge on the stud B' to raise the plungers U until after they have been raised out of the mold by the mechanism which raises the lower plungers to eject the brick from the mold, so that the upper plungers rest upon and are carried up out of the mold by the brick which are being ejected; but when the upper plungers are fairly out of the mold the cams O operate on the studs B' to carry the upper plungers sufficiently high to allow the feed-box to be brought over to fill the molds, when by sudden and abrupt termination of the cams O the upper plungers are allowed to fall onto the clay in the mold, after which the cam N impinges on the roller C' to force the upper plungers down and exert the requisite pressure on the brick.

It will be seen that by this arrangement the upper plungers are not withdrawn from the brick while in the mold, but are carried up by the brick until the top of the mold is reached, when they are withdrawn therefrom, thus preventing the formation of cracks or the injury of the brick by the force of suction, as is the case when the upper plungers are withdrawn while the brick are in the mold.

S', Fig. 2, is the clay-hopper, and S⁵ the mold-filler adapted to be moved back and forth over the table T' to fill the molds with clay, and also to push the newly-formed brick forward off of the tops of the lower plungers, and is operated in the following manner.

U' is a curved rocking arm pivoted in the frame A' and standard C, the upper end of which projects over to engage with a cam-groove, V', formed on the side of the wheel K, said arm being provided with a friction-wheel on that portion which projects into the cam-groove V'.

W' is a rod or bar, (shown in dotted lines, Fig. 2,) the upper end of which is secured to the free end of the rocking arm U', while the lower end is secured to the free end of the lever A'', said lever being secured to the shaft B''.

C'' is a lever similar to lever A'', and is also secured to the shaft B'', the free end of said lever being secured to the feed-hopper by means of the bar D'', so that when the lever U' is raised and lowered by means of the cam-groove V' the feed-box will be moved over to charge the mold with clay and then back again to its normal or original position.

In the modification shown in Fig. 2 the pin F' is adjustably secured in the upper end of the rocking arm E', the office, operation, and function of which will now be described.

The stud or pin F' is mounted in a sliding block, O', which is free to work in the segmental slot P', formed in the upper end of the rocking arm E', said block being raised and lowered by means of the screw-rod Q', which is mounted in suitable bearings and operated by the hand-wheel R'.

The object of having the pin or stud F' adjustable is to increase or diminish the throw or movement of the rocking arm E' by moving the stud farther from or nearer to the pivotal point of the rocking arm, and thus the distance of the movement of the lower plungers is regulated and the clay-holding capacity of the molds increased or diminished to make a light or heavy or thick or thin brick, as may be desired. I prefer, however, to use the wedge-shaped block E⁴ instead of the modification just described, for the reason that it affords a better foundation to resist the blow of the top plunger.

In Figs. 5 and 6 I have shown devices for oiling the interior of the molds while the brick is being ejected therefrom, which will now be described.

The lower plungers, S, are provided with a channel or duct, $a^6$, which extends entirely around the same, said duct or channel being located directly beneath the top plate, $b^6$, of the plunger. The duct or channel $a^6$ is provided with numerous perforations $c^6$, through which the oil is forced onto the sides of the mold. The duct or channel $a^6$ is connected to the oil reservoir or cylinder $d^6$ by means of the pipe or tube $e^6$, and the cylinder $d^6$ is provided with a floating piston, $f^6$, which rests or floats upon the oil in said cylinder or reservoir.

$g^6$ is a bracket or stop adjustably secured to the side of the machine, against which the upper end of the piston $f^6$ impinges when the lower plunger is raised to eject the brick from the mold. This forces the piston down in the cylinder $d^6$ and causes the oil to exude or spurt from the ducts $c^6$ onto the sides of the mold at each upward movement of the lower plunger.

Having thus described my invention, what I claim, and desire to secure by Letters Patent, is—

1. In a brick-machine, an adjustable and movable stop, a lower plunger supported thereon in the mold while the same is being filled with clay and during a portion of the pressing action, said stop adapted to be withdrawn to allow the upper and lower plungers and the partially-pressed clay to move downward within the mold, and a permanent stop to support the same before the final pressure of the upper plunger is applied, substantially as and for the purpose set forth.

2. A brick-machine the upper plungers of which are secured to a yoke working in suitable ways, said yoke being raised by cams having an abrupt termination, whereby the yoke and the plungers are allowed to fall suddenly, the plungers entering the mold to compact the clay prior to receiving the final pressure, as set forth.

3. In a brick-machine, the upper plungers which are secured to a yoke working in suitable ways, said yoke being raised by cams having an abrupt termination to allow the yoke and plungers to fall suddenly on the clay within the mold, in combination with an additional cam for forcing the upper plungers down to execute the final pressure on the top of the brick, as set forth.

4. In a brick-machine of the character described, the shaft L, provided with a cam, N, for moving the upper plungers downward to exert pressure on the brick, and with cams O, for raising said plungers, the cams O being so arranged and timed in their movements that they will operate to raise the plungers after they have been carried up out of the molds, as set forth.

5. In a brick-machine of the character described, the upper plungers secured to a yoke, V, said yoke being provided with pins, studs, or friction-rollers B, and adapted to slide in ways W, in combination with the cams O and shaft L, as set forth.

6. In a brick-machine, the rocking arm E', secured to the levers H' and I' in the manner described, in combination with the wheel K, provided with cam-groove G', whereby the lower plungers are raised to eject the brick from the mold, as set forth.

7. In a brick-machine, the rocking arm E', adapted to raise the lower plungers, said arm being provided with an adjustable pin adapted to engage a cam-groove in the wheel K, whereby the throw of said arm is regulated, as set forth.

8. In a brick-machine, the rocking arm E', provided with segmental slot P', and the block O', carrying the pin F', adapted to slide in said slot, in combination with the screw-rod Q' and hand-wheel R', whereby the pin F' is adjusted and held at any desired point in the slot, as set forth.

9. In a brick-machine, the wedge $E^4$, pivoted to the adjustable lever $F^4$ and supporting the rubber cushion $A^4$, in combination with the rocking arm $D^4$ and the mechanism for operating the same, whereby the rubber block or cushion is lowered during the pressing operation to allow the cross-head of the lower plungers to come in contact with rigid or permanent stops before the final pressure is applied to the top of the brick.

10. The shaft $C^4$, provided with the weighted lever $A^5$ and the arm $D^4$, in combination with the pivoted block $E^4$, block $I^4$, and rubber cushion $A^4$, as and for the purpose set forth.

11. In a brick-machine, the combination of the lower plungers provided with the oil-ducts and carrying the oil-reservoir thereon, with a floating piston, and a suitable bracket or stop for forcing the piston down into the reservoir, whereby the molds are oiled automatically at each upward movement of the lower plungers.

12. In a brick-machine of the character described, the cam N, provided with a surface of different radii, one of which forces the upper plunger down to press the upper side of the brick, while the other surface diminishes or retreats in its radius to allow the upper plunger to retreat during a portion of the pressing operation, in combination with the lower plunger, toggle-levers, and devices, substantially as described, for operating said levers, whereby the upper plunger is checked in its upward movement, forming a moving resistance to the clay while being pressed on the under side by the lower plunger, as set forth.

13. The combination of the cam N, having the retreating surface from 2 to 3, adapted to impinge on the top of the upper plunger, with the rods P, levers Q, toggles R, and plungers S, whereby the upper plungers are permitted to recede at a lower rate of speed than the upward movement of the lower plunger, and the whole body of the clay moved in the mold during the pressing operation, as set forth.

14. In a brick-machine, a cam provided with a surface of different radii, one of which forces the one plunger to press the one side of the brick, while the other surface diminishes or retreats in its radius, so as to allow the other or opposite plunger to advance and exert the final pressure on the brick.

In testimony whereof I affix my signature in presence of two witnesses.

PETER L. SIMPSON.

Witnesses:
 OVID A. BYERS,
 A. A. PAGE.